United States Patent Office.

HARRIS MORSE, OF COLUMBIA, CALIFORNIA.

IMPROVEMENT IN THE TREATMENT OF SNOW OR ICE TO CONVERT IT INTO LARGE BLOCKS.

Specification forming part of Letters Patent No. 28,292, dated May 15, 1860.

*To all whom it may concern:*

Be it known that I, HARRIS MORSE, of Columbia, in the county of Tuolumne and State of California, have invented a new and useful mode of treating snow or ice in small lumps or fragments, whereby the same may be converted into solid masses or blocks; and I do hereby declare that the same is fully described and represented in the following specification.

In carrying out my invention I take snow in its natural state, or ice in small lumps, fragments, or masses, and put the same in a suitable vessel or receiver, and while therein I extract the air from the said snow or ice, either by a powerful pressure equal to about seven hundred pounds the square inch, exerted upon a piston playing into the said vessel, or by an air-pump or other suitable mechanical means for exhausting air from the vessel, subsequently producing the requisite compactness or condensation of the mass by a due amount of pressure. Next, should the temperature of the atmosphere be below 32° Fahrenheit, I expose the "deaerated" mass to such for about twelve hours; or, should the temperature of the atmosphere be higher, the mass is to be placed in a close room or box, made as nearly air-tight as possible, and there suffered to remain for about twenty-four hours, after which it may be stored in a suitable ice-preserving house. During the process of putting the material into the vessel in which it is to be deprived of air and compacted the mass should be occasionally sprinkled or moistened with water, provided it may not contain within itself a sufficient amount of water not frozen. In sprinkling the water over it care should be taken that it may be thoroughly done, and in such a manner as to cause the water to permeate the mass equally. A common watering-pot will answer for such purpose; but any other means by which the water may be equally distributed throughout the mass may be employed.

By the above process I can convert either snow or small fragments of ice into large blocks of clear or pellucid ice, fit for the market. The blocks so made appear to be much more durable than blocks of natural ice of the same size, because the air, being expelled from the mass, cannot act on the interior thereof, so as to facilitate its liquefaction, and, besides, the pressure of the atmosphere on the mass operates to keep it compacted, so as to prevent (more or less) the entrance of heat and air into it.

In California, where there is little snow, or where ice makes of little thickness, my invention is found to be of great practical advantage in producing large masses or blocks of ice fit for transportion and preservation. I have been enabled to produce such at much less cost than ice can be afforded when brought from colder climates, or where water may freeze to a foot or more in thickness. By the help of a three-horse-power steam-engine, and suitable means for removing the air from and consolidating the snow, I have been able to make about ten tons of the blocks per day, and retail it in the principal inland towns in California at prices much below those for which the natural ice could be procured in like size and sold.

I have subjected my invention to such thorough practical tests that I am satisfied that it is calculated to be one of great benefit in many, and particularly the warmer, parts of the United States.

I do not claim the broad method of solidifying the pulverulent substances by the combined operation of exhaustion and mechanical pressure—a method already in use—as in the manufacture of pencils from powdered graphite.

I claim—

The said process of treating snow or small pieces of ice in order to convert the same into large blocks or masses fit for preservation and use, as described.

HARRIS MORSE.

Witnesses:
P. H. SMITH,
B. F. RYDER.